United States Patent [19]

Nakane et al.

[11] Patent Number: 4,483,651
[45] Date of Patent: Nov. 20, 1984

[54] AUTOMATIC APPARATUS FOR CONTINUOUS TREATMENT OF LEAF MATERIALS WITH GAS PLASMA

[75] Inventors: Hisashi Nakane, Kawasaki; Akira Uehara, Yokohama; Shigekazu Miyazaki, Sagamihara; Hiroyuki Kiyota, Hiratsuka; Isamu Hijikata, Tokyo, all of Japan

[73] Assignee: Tokyo Ohka Kogyo Kabushiki Kaisha, Kanagawa, Japan

[21] Appl. No.: 292,417

[22] Filed: Aug. 13, 1981

[30] Foreign Application Priority Data

Aug. 14, 1980 [JP] Japan .......................... 55-114556[U]

[51] Int. Cl.³ ............................................ B65G 47/24
[52] U.S. Cl. .................................... 414/217; 198/341; 198/369; 198/437; 271/184; 271/225; 414/173; 414/222
[58] Field of Search ............... 414/217, 222, 225, 281, 414/285, 152, 172, 173, 220; 198/341, 339, 369, 370, 437, 457; 271/184, 225; 118/50, 50.1

[56] References Cited

U.S. PATENT DOCUMENTS

| | | | |
|---|---|---|---|
| 3,469,887 | 9/1969 | Nakahara et al. | 198/369 |
| 3,710,917 | 1/1973 | Black | 198/371 |
| 3,812,947 | 5/1974 | Nygaard | 198/341 |
| 3,973,665 | 8/1976 | Giammanco | 414/217 |
| 4,094,722 | 6/1978 | Yamamoto et al. | 156/345 |
| 4,149,923 | 4/1979 | Uehara et al. | 156/345 |
| 4,151,034 | 4/1979 | Yamamoto et al. | 156/345 |
| 4,208,159 | 6/1980 | Uehara et al. | 414/225 |

FOREIGN PATENT DOCUMENTS 4244 1/1981 Japan .......................... 414/222

Primary Examiner—Robert B. Reeves
Assistant Examiner—Donald T. Hajec
Attorney, Agent, or Firm—Armstrong, Nikaido, Marmelstein & Kubovcik

[57] ABSTRACT

The invention provides a novel automatic apparatus for the continuous treatment of wafer materials, e.g. of silicon semiconductor, with gas plasma provided with a plural number of the gas plasma reaction chambers, transfer devices for bringing the wafer materials into and out of each of the reaction chambers and automatic control mechanism for controlling the individual parts of the apparatus in linkage operation. The transfer devices are composed of a main transfer conveyor extending in parallel with the array of the reaction chambers and over whole length of the array, a plural number of branched transfer conveyors each connecting one of the reaction chambers with the main transfer conveyor, a mechanism for transferring the wafer between the main transfer conveyor and one of the branched transfer conveyor and a mechanism for bringing the wafer material from the branched transfer conveyor to the gas plasma reaction chamber or vice versa. Transferring and gas plasma treatment of the wafer materials can be performed in continuous and successive linkage operations by virtue of the automatic control mechanism. The inventive apparatus is very advantageous in the continuous and concurrent handling of a plural number of wafer materials in the process of the gas plasma treatment so that excellent productivity of the process and highly uniform quality of the treated wafer materials are ensured.

6 Claims, 6 Drawing Figures

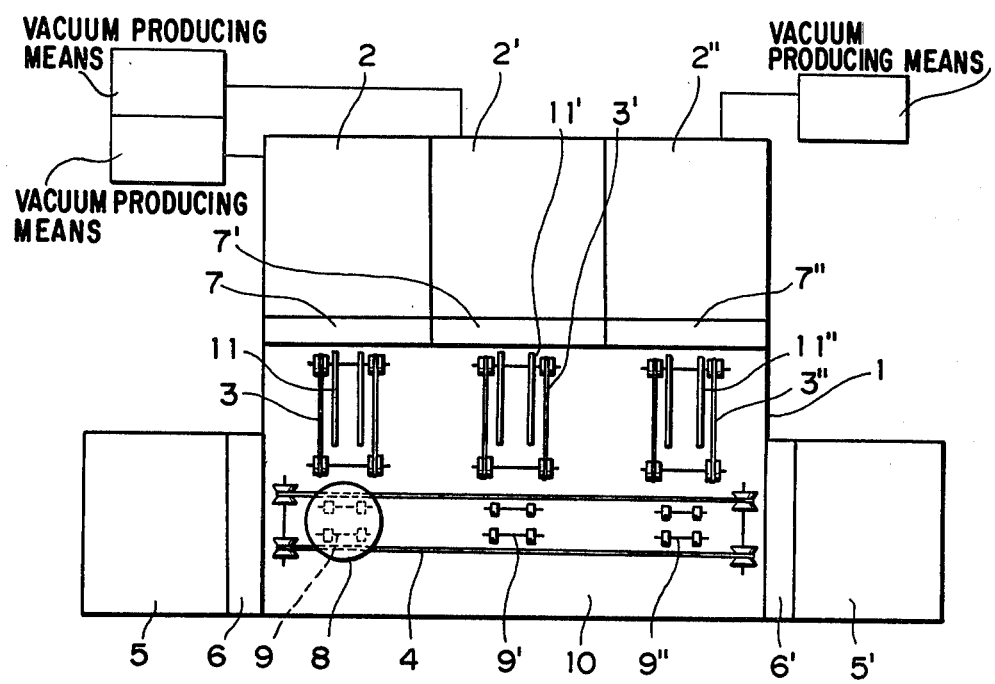

4,483,651

AUTOMATIC APPARATUS FOR CONTINUOUS TREATMENT OF LEAF MATERIALS WITH GAS PLASMA

BACKGROUND OF THE INVENTION

1. Field of the Invention

The present invention relates to an automatic apparatus for the continuous treatment of leaf materials such as wafers of high-purity silicon semiconductors by reaction with gas plasma suitable for use in a production line of semiconductor elements or devices or, more particularly, to an apparatus for the treatment of wafer materials by gas plasma reaction having improved capacity for the treatment, which is provided with a plural number of adjoined gas plasma reaction chambers, the plural number of the reaction chambers being successively brought into operation by an automatic control means so as to transfer the wafer materials continuously.

2. Disclosure of the Prior Art

In recent years, etching treatment of semiconductor wafers and removal of photoresist by ashing in the semiconductor industry have been more and more widely performed by use of an apparatus for the treatment by gas plasma reaction. In the early stage of the development of such an apparatus, the treatment was undertaken batch-wise by holding a plural number of the wafers upright in a reaction tube and exposing them to the gas plasma simultaneously. Along with the recent trends wherein the patterns on the wafers are becoming finer and finer, larger and larger wafers are subjected to the plasma treatment and the production line is desired to be less labor-consuming, the batch-wise apparatus for the treatment as mentioned above has become obsolete due to the increasingly outstanding disadvantages. These include (1) the accuracy of working is insufficient, (2) the effect of the plasma treatment is not uniform from wafer to wafer, (3) the working efficiency is low due to the time-consuming hand works and (4) many of the wafers undergo various damages during the treatment. These disadvantages are more remarkable, in particular, in the treatment of the wafers having larger diameters.

In order to overcome the above described disadvantages, various attempts have been made hitherto proposing an apparatus for the continuous and automatic treatment of wafer materials with gas plasma. These automatic apparatuses for continuous gas plasma treatment have excellent characteristics of increased uniformity in the effectiveness of treatment and the improved reproducibility of extremely fine patterns as well as the decreased overall time taken for the treatment. Thus, they are widely used in the modern semiconductor industry as an apparatus capable of being in compliance with the requirements in the age of ultra-LSIs. There is, however, an eager desire for an apparatus with which further improvement of the productivity is obtained leading to lower and lower costs in the production of semiconductor devices.

In order to comply with such a desire, an attempt has been made to produce a method in which the capacity of the apparatus for treatment of, for example, gas plasma etching is obtained by increasing the temperature of treatment or by increasing the applied electric voltage. These methods are indeed effective in shortening the time of treatment with improved productivity but, on the other hand, are unavoidably accompanied by the disadvantages that, as the size of the wafers treated by the method becomes larger and larger, the variation in the effectiveness of the treatment increases resulting in lowered yield of the wafer products.

Most of the conventional automatic apparatus for the continuous plasma treatment of wafer materials are provided with a single gas plasma reaction chamber so that, when either one of the mechanism for the transfer of the wafers and the gas plasma reaction chamber is in operation, the other is necessarily alternately in a repose period. Therefore, improvement in the productivity of the plasma treatment process is usually obtained by the parallel installation and operation of a number of such unit apparatuses. This method of operation of the apparatuses is rather impractical because of the large expense for the installation of the apparatuses, the large space required for the installation thereof, the difficulties involved in the adjustment and conditioning of the individual apparatuses and the control of the operational conditions thereof.

SUMMARY OF THE INVENTION

It is therefore an object of the present invention to provide a novel and improved automatic apparatus for the continuous gas plasma treatment of leaf materials or wafers provided with a plural number of gas plasma reaction chambers for treatment of wafers to be imparted with a greatly increased capacity for the treatment of wafers.

Another object of the present invention is to provide an automatic apparatus for the continuous treatment of wafer materials with gas plasma operated by an automatic control mechanism in which the mechanism for the transfer of the wafers and the gas plasma reaction chambers are efficiently operated with mutual linkage to give excellent productivity.

Still another object of the present invention is to provide an automatic apparatus for the continuous gas plasma treatment of wafer materials constructed in a compact design and operated with high efficiency, with which the wafer materials can be treated with an extremely small variation in the effectiveness of the treatment and with a remarkably decreased danger of damage caused in the wafers during the treatment.

BRIEF DESCRIPTION OF THE DRAWING

FIG. 1 is a schematic plan view of a typical model of the inventive apparatus.

DETAILED DESCRIPTION OF THE PREFERRED EMBODIMENTS

Figure 2A:
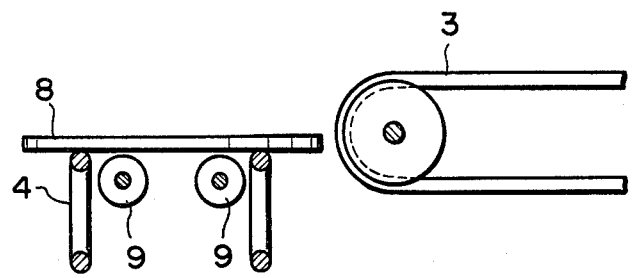
FIGS. 2(A), 2(B) and 2(C) are each a schematic elevational side view of the apparatus for illustrating the transfer of the wafer materials from the main conveyor to the branch conveyors or vice versa.

As is mentioned above, the present invention relates to an improvement of an automatic apparatus for the continuous gas plasma treatment of wafer materials known in the prior art proposing an apparatus excellent in practicability with greatly increased capacity of wafer treatment and further relates to a novel apparatus for the treatment of wafer materials provided with a plural number of separate, adjoining gas plasma reaction chambers. That is to say, the apparatus of the present invention is constructed by a combination comprising a plural number of separate, adjoining gas plasma reaction chambers for wafer treatment, a mechanism for the transfer of the wafers into and out of the said gas plasma reaction chambers and an automatic control means for bringing the reaction chambers and the transfer mechanism into effective linkage operation, preferably, along with a cassette for holding the wafers to be subjected to the treatment and a cassette for holding the wafers after the treatment.

In the following, the apparatus of the present invention is described in further detail with reference to the accompanying drawing.

FIG. 1 is a schematic plan view illustrating an example of the inventive apparatus which is constructed with cassette chambers 5, 5' for the wafer materials, a space 10 for the transfer conveyor and three gas plasma reaction chambers 2, 2', 2''. The wafer cassette 5 for holding the wafers before plasma treatment is provided with a shutter 6 which partitions the cassette chamber 5 and the conveyor space or chamber 10. When the shutter 6 is opened, a wafer before plasma treatment is taken out of the cassette 5 and transferred to the conveyor chamber 10. The wafer thus taken out is mounted on the main transfer conveyor 4, which is constructed, for example, with a pair of wires, and transferred toward the other cassette 5'. Between the pair of the wires forming the main transfer conveyor 4, three pairs of rollers 9, 9', 9'' are provided each at the position facing one of the gas plasma reaction chambers 2, 2', 2'', respectively. Each pair of the rollers is rotatable in a direction so as to transfer the wafers in the direction perpendicular to the transferring direction of the main transfer conveyor 4. A wafer mounted on and transferred by the main transfer conveyor 4, when it arrives at the position just above one of the pairs of rollers. e.g. roller pair 9, is stopped there by means of a stopper (not shown in the figure) and simultaneously lifted up by the pair of rollers 9 to be placed on a branched wire conveyor 3 for transferring the wafer from the main transfer conveyor 4 to the gas plasma reaction chamber 2.

Figure 2B:
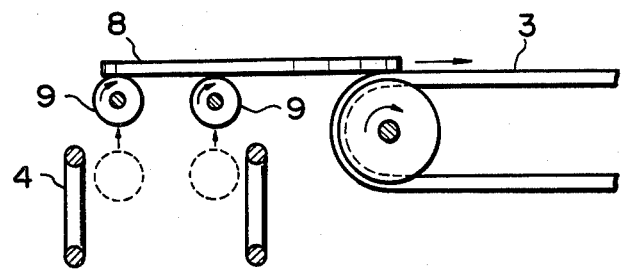

FIG. 2(A) is an elevational side view schematically illustrating the apparatus at the moment when the wafer has arrived at the position just above the above mentioned pair of rollers 9 and stopped there. FIG. 2(B) is also a schematic elevational side view of the apparatus showing the wafer lifted up by the pair of the rollers 9, which is movable up and down, and just being transferred on to the branched transfer conveyor 3.

Alternatively, the wafer may be transferred from the main transfer conveyor 4 to one of the branched transfer conveyors 3, which is adjacent to the main transfer conveyor 4 at the side thereof and capable of transferring the wafer in the direction perpendicular to the running direction of the main transfer conveyor 4, when the main transfer conveyor 4 is pushed down so as to rest the wafer on the rollers 9 to convey it in the perpendicular direction. It is of course that any other suitable means can be undertaken to transfer the wafer from the main transfer conveyor 4 to the branched side conveyor 3. Further alternatively, the branched transfer conveyor 3 may be replaced with other suitable transfer means to bring the wafer directly before the gas plasma reaction chamber 2 with a change of the moving direction from the main transfer conveyor 4.

The wafer material having arrived at the direct front of the gas plasma reaction chamber 2 is then transferred into the reaction chamber 2 through the open slit in the shutter 7 by means of the wafer-transfer arms 11 capable of thrusting out of and into the reaction chamber 2. When the wafer mounted on the arms 11 has arrived at the center of the reaction chamber 2, the arms 11 are thrusted out of the chamber 2 leaving the wafer in the chamber 2 and the shutter 7 is closed. Any other suitable means may be undertaken for the transfer of the wafer material on the branched transfer conveyor 3 into our out of the gas plasma reaction chamber 2. Thereafter, the gas plasma reaction chamber 2 is evacuated to a suitable pressure of vacuum by means of a vacuum pump (not shown in the figure) and the gas plasma treatment of the wafer is performed in a conventional manner.

While the above mentioned first wafer is undergoing the gas plasma treatment in the reaction chamber 2, a second wafer is taken out of the cassette 5 and brought into the second gas plasma reaction chamber 2' by the main transfer conveyor 4 and the second branched transfer conveyor 3' in the same manner as the first wafer and subjected there to the gas plasma treatment in the same conditions as in the first reaction chamber 2.

Similarly, a third wafer is brought into the third gas plasma reaction chamber 2'' by the main transfer conveyor 4 and the third branched transfer conveyor 3'' while the first and the second wafers are undergoing the gas plasma treatment in their respective reaction chambers 2 or 2'. The third wafer is subjected to the gas plasma treatment in the third gas reactor chamber in the same conditions as in the first and the second reaction chambers 2, 2'.

As is well known, gas plasma treatment is a technique useful for cleaning or etching of semiconductor substrate, ashing of the resist, etching of the selectively masking substrate and the like purposes as well as, although the conditions for the gas plasma generation should be somewhat modified, for chemical and physical vapor depositions. These techniques are known in the art and the conventional procedures may be applied altogether as such also to the gas plasma treatment using the inventive apparatus.

Figure 2C:
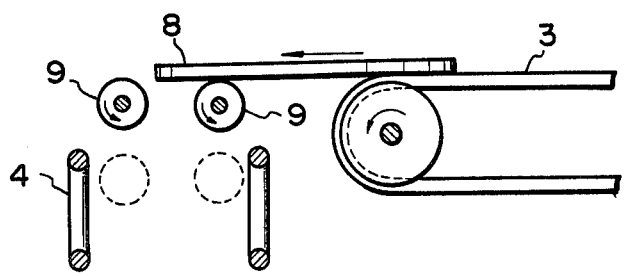

While the second and the third wafers are brought into the gas plasma reaction chambers 2' or 2'' and subjected there to the gas plasma treatment, the gas plasma treatment of the first wafer is completed in the first reaction chamber 2. The treated wafer is taken out of the chamber 2 by the operation of the conveyors in a reversed manner of the above described process for the transfer of the wafer into the reaction chamber 2. To describe more particularly, the shutter 7 of the gas plasma reaction chamber 2 is first opened and the wafer in the reaction chamber 2 is taken out, for example, by the thrusting arms 11 and mounted on the branched transfer conveyor 3. Reverse movement of the branched transfer conveyor 3 transfers the wafer on to the main transfer conveyor 4. Along with the reverse transfer of the wafer on the branched transfer conveyor 3, the pair of rollers 9 is pushed up to the position for receiving the wafer as is shown in FIG. 2(C) and the wafer received by the rollers 9 is mounted on the main transfer conveyor 4 to be conveyed toward the cassette chamber 5' for the treated wafers. In the next place, the wafer is transferred by the main transfer conveyor 4 and placed in the cassette chamber 5' for the treated wafers through the shutter 6'. On the other hand, a fourth wafer to be treated next is taken out of the cassette chamber 5 and brought into the first gas plasma chamber 2 by means of the wafer transfer mechanism and subjected there to the gas plasma treatment in the same manner as before.

As is understood from the above description, while a wafer is brought into and taken out of one of the gas plasma reaction chambers, the other gas plasma reaction chambers are occupied by other wafers under the gas plasma treatment. Therefore, an extremely high efficiency is obtained with the inventive apparatus provided with a plural number of the gas plasma reaction chambers when a suitable time lag is successively provided between or among the reaction chambers for the phase of the chamber operation and the repose period of the chambers resulting in substantially continuous transfer of the wafers.

Figure 3:
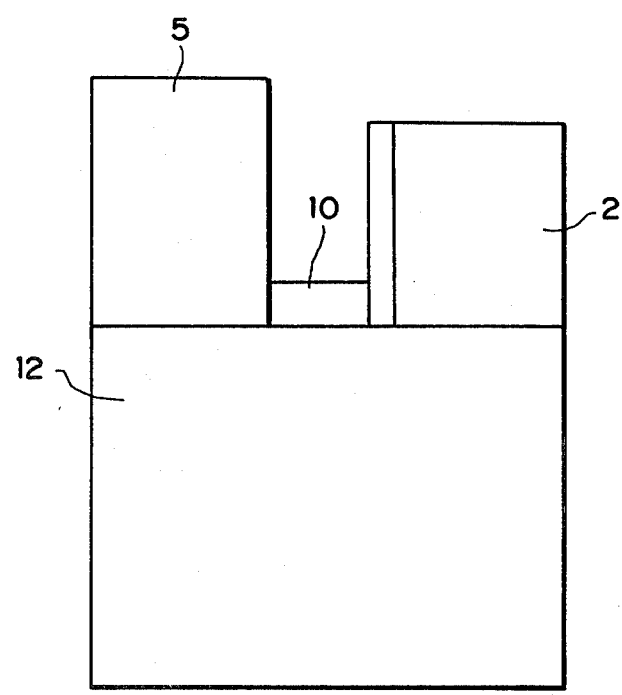
FIG. 3 is a schematic elevational side view of the inventive apparatus illustrated in FIG. 1.

The above described operation of the reaction chambers and the conveyors for the parallel treatment of the wafers can be controlled by means of an automatic control means. That is, the automatic control means for the inventive apparatus is constructed substantially with a microcomputer. The control device for controlling the individual parts of the inventive apparatus in mutual linkage motion may be a conventional control device used for controlling various kinds of automatic machines. For example, a plural number of cams are provided on a rotating shaft and each of the cams is operated to start or stop a part of the apparatus according to the desired conditions of operation. Alternatively, relays are useful for controlling the linkage motion of the individual parts of the apparatus. The microcomputer may be located in the drive control unit 12 as is shown in FIG. 3. The microcomputer may be provided with memories for the variation or bias in the effect of the gas plasma treatment more or less unavoidable among the reaction chambers.

The inventive apparatus can be designed very compactly for the increased capacity for the wafer treatment in comparison with conventional apparatuses so that the wafer cassette chambers 5,5', the transfer chamber 10 for the transfer conveyors and the gas plasma reaction chambers 2,2',2" may be individually evacuated in advance to the desired degree of vacuum by use of respective vacuum producing means or pumps although the treatment of the wafers may be carried out by separately evacuating each of the gas plasma reaction chambers as is described above.

Although the above description is given for the reason of convenience with reference to FIG. 1 illustrating an apparatus provided with threefold gas plasma reaction chambers, the number of the gas plasma reaction chambers may be further increased by use of a suitable combination of the mechanism for the wafer transfer and the automatic control means. For example, an apparatus provided with four- to sixfold reaction chambers can be designed and even such a multifold apparatus can satisfactorily be controlled with a single automatic control device. Even the simplest of the inventive apparatus, i.e. with two reaction chambers, can exhibit a capacity for the wafer treatment more than doubled over the conventional apparatus for the wafer treatment.

In addition, the gas plasma reaction chambers can be operated with independent setting of the conditions for gas plasma generation from each other including the radio frequency power, kind of the plasma gas introduced into the chamber, pressure of the gas, degree of vacuum and the like so that the inventive apparatus is useful for successively undertaking different treatments such as etching, ashing, cleaning and the like.

Figure 4:
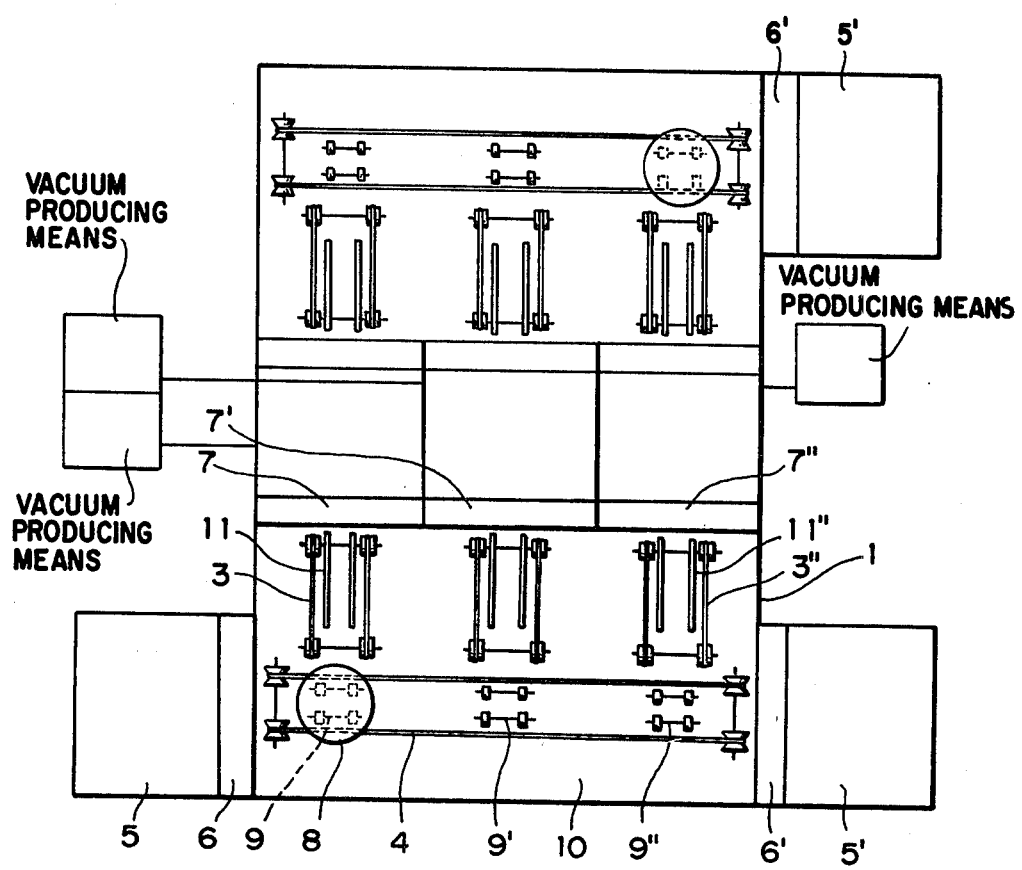
FIG. 4 is a schematic plan view of another embodiment of the inventive apparatus.

In addition to the shutters 7, 7', 7" at the front of the respective gas plasma reaction chambers 2, 2', 2", it is optional that each of the plasma reaction chambers is provided with another shutter at the side of the chamber opposite to the shutter 7, 7' or 7" so that one of the shutters belonging to a chamber is exclusively used for bringing the wafers into the chamber while the other shutter is used exclusively for taking the wafers out of the chamber with further increased capacity of the apparatus. Further, each chamber can also be provided with a means for taking the wafer material out of the chamber and means for transferring the treated wafer material to a subsequent location as shown in FIG. 4.

It is usual in the inventive apparatus that the number of the gas plasma reaction chambers is determined in consideration of the times required for the transfer and the gas plasma treatment of a wafer so that the apparatus is designed to be able to exhibit a maximum capacity for the wafer treatment.

As is described above, the inventive apparatus can be operated as a successive combination of the operations of the individual unit parts substantially in a line installed within a narrow space resulting in several times multiplication of the capacity for the wafer treatment. In this manner, the apparatus of the present invention is very advantageous in labor saving and increase of profitability of a production line for semiconductor devices. Further, a single automatic control device can well control all of the wafer transfer mechanism and the gas plasma reaction chambers so that, once the memory in the automatic control device has been established, a multi-job operator can successfully operate the apparatus concurrently with his different jobs.

What is claimed is:

1. An automatic apparatus for the continuous treatment of wafer materials with gas plasma comprising a plural number of adjoining, separate gas plasma reaction chambers for the treatment of the wafer materials arranged in an array, a transfer means for bringing the wafer materials into and out of the gas plasma reaction chamber and an automatic control means: each gas plasma reaction chamber having an inlet shutter said transfer means for the wafer materials being composed of a transfer chamber, a main transfer conveyor in said transfer chamber extending in parallel with the array of said gas plasma reaction chambers over the whole length of said array, branched transfer conveyors in said transfer chamber provided in the same plural number as the gas plasma reaction chambers each connecting the main transfer conveyor and the inlet of one of the said gas plasma reaction chambers, plural means in said transfer chamber for transferring the wafer material from the main transfer conveyor to one of the branched transfer conveyors and plural means, in said transfer chamber each provided in the vicinity of the inlet of one of the gas plasma reaction chambers for transferring the wafer material from one of the branched transfer conveyors into the corresponding gas plasma reaction chambers, said transfer chamber having an inlet shutter and an outlet shutter; and independent vacuum-producing means for each of said gas plasma reaction chambers and said transfer chamber;

said automatic control means being operable to bring the said transfer means and the gas plasma reaction into continuous and successive linkage operation.

2. The apparatus as claimed in claim 1 wherein the main transfer conveyor is a wire conveyor formed of a pair of wires and each means for transferring the wafer material to one of the branched transfer conveyors is a pair of rollers positioned between the wires of the wire conveyor as the main transfer conveyor and capable of being pushed up and down between the wires relative to the main transfer conveyor.

3. The apparatus as claimed in claim 1 wherein each means for transferring the wafer material from the branched transfer conveyor into the gas plasma reaction chamber is an arm thrustable into and out of the gas plasma reaction chamber.

4. The apparatus as claimed in claim 1 wherein the main transfer conveyor is provided with a cassette chamber for holding the wafer materials before treatment at one end thereof and a cassette chamber for holding the wafer materials after treatment at the other end thereof.

5. The apparatus as claimed in claim 1 wherein each of the gas plasma reaction chambers is provided on the side opposite to the branched transfer conveyor with a shutter, a means for taking the wafer material out of the chamber and a means for transferring the treated wafer material.

6. The apparatus as claimed in claim 1 wherein the automatic control means is constructed substantially with a microcomputer.

* * * * *